United States Patent [19]
Otomo

[11] Patent Number: 6,104,541
[45] Date of Patent: Aug. 15, 2000

[54] COLLIMATOR LENS AND OPTICAL SCANNING APPARATUS USING THE SAME

[75] Inventor: Ryoko Otomo, Omiya, Japan

[73] Assignee: Fuji Photo Optical Co., Ltd., Saitama, Japan

[21] Appl. No.: 09/247,939

[22] Filed: Feb. 11, 1999

[30] Foreign Application Priority Data

Mar. 20, 1998 [JP] Japan .................................. 10-092620

[51] Int. Cl.[7] .............................. G02B 27/30; G02B 3/00; G02B 9/34
[52] U.S. Cl. ........................... 359/641; 359/662; 359/773
[58] Field of Search .................................... 359/641, 662, 359/773, 781, 206

[56] References Cited

U.S. PATENT DOCUMENTS

| | | | |
|---|---|---|---|
| 4,624,535 | 11/1986 | Kurihara et al. ......................... | 359/659 |
| 5,386,312 | 1/1995 | Spencer .................................... | 359/215 |
| 5,691,835 | 11/1997 | Iizuka ....................................... | 359/206 |
| 5,774,279 | 6/1998 | Kiriki et al. .............................. | 359/753 |
| 6,014,262 | 1/2000 | Noda ........................................ | 359/641 |

FOREIGN PATENT DOCUMENTS

| | | | |
|---|---|---|---|
| 61-147225 | 7/1986 | Japan .............................. | G02B 27/30 |
| 61-173214 | 8/1986 | Japan .............................. | G02B 27/30 |
| 61-173215 | 8/1986 | Japan .............................. | G02B 27/30 |

*Primary Examiner*—Georgia Epps
*Assistant Examiner*—Saeed Seyrafi
*Attorney, Agent, or Firm*—Snider & Associates; Ronald R. Snider

[57] ABSTRACT

A collimator lens comprises, successively from a parallel luminous flux side, a positive lens, a cemented lens made of negative and positive lenses, a positive lens, and a negative lens, and satisfies a predetermined conditional expression, whereby, when carrying out multi-beam scanning, various kinds of aberration, such as image surface curvature amount in particular, are greatly reduced with respect to the respective light beams from individual light sources. Successively disposed from the parallel luminous flux side are a first lens $L_1$ made of a biconvex lens having a surface with a stronger curvature directed onto the parallel luminous flux side, a second lens $L_2$ made of a biconcave lens having a surface with a stronger curvature directed onto the parallel luminous flux side, a third lens $L_3$ made of a biconvex lens having a surface with a stronger curvature directed onto the light source side, a fourth lens $L_4$ made of a biconvex lens having a surface with a stronger curvature directed onto the parallel luminous flux side, and a fifth lens $L_5$ made of a negative meniscus lens having a concave surface directed onto the parallel luminous flux side and a plane directed onto the light source side. The second lens $L_2$ and the third lens $L_3$ are cemented together. These lenses satisfy a conditional expression of $0.9 < |F_5/F_T| < 2.5$, where $F_5$ is the focal length of the fifth lens $L_5$, and $F_T$ is the focal length of the whole lens system.

10 Claims, 8 Drawing Sheets

FIG.1

LIGHT SOURSE SIDE →

FIG. 3A
EXAMPLE 1
COMA

1.8°

FIG. 3B
EXAMPLE 1
COMA

1.3°

FIG. 3C
EXAMPLE 1
COMA 0.9°

FIG. 3D
EXAMPLE 1
COMA

0°

FIG. 4C EXAMPLE 2 ω=1.8°

FIG. 4B EXAMPLE 2 ω=1.8°

FIG. 4A EXAMPLE 2 F=1.29

FIG. 5A
EXAMPLE 2
COMA

FIG. 5B
EXAMPLE 2
COMA

FIG. 5C
EXAMPLE 2
COMA

FIG. 5D
EXAMPLE 2
COMA

FIG. 7A
EXAMPLE 3
COMA 1.8°

FIG. 7B
EXAMPLE 3
COMA 1.3°

FIG. 7C
EXAMPLE 3
COMA 0.9°

FIG. 7D
EXAMPLE 3
COMA

COLLIMATOR LENS AND OPTICAL SCANNING APPARATUS USING THE SAME

RELATED APPLICATIONS

This application claims the priority of Japanese Patent Application No. 10-92620 filed on Mar. 20, 1998, which is incorporated herein by reference.

BACKGROUND OF THE INVENTION

1. Field of the Invention

The present invention relates to a collimator lens used in an optical scanning apparatus for scanning a laser beam for recording or displaying an image, such as copier, laser printer, or the like; and, in particular, to a collimator lens for converting a divergent luminous flux emitted from a light source such as a semiconductor laser into a parallel luminous flux, and an optical scanning apparatus using the same.

2. Description of the Prior Art

Various kinds of optical scanning apparatus for scanning a laser beam in order to record or display an image, such as copier, laser printer, and the like, have conventionally been known.

Such an optical scanning apparatus is configured so that a laser beam emitted from a semiconductor laser is converted into a parallel luminous flux by a collimator lens, the resulting parallel luminous flux is deflected as a rotary polygon mirror rotates, and thus deflected luminous flux is focused onto an imaging surface with the aid of an fθ lens.

Since typically employed collimator lenses are required to mainly satisfy axial performances, many of them have been known to be constituted by two or three lens elements as disclosed in Japanese Unexamined Patent Publication Nos. 61-173214 and 61-147225, for example.

Their out-of-axis performances, however, can only be appropriate within a very narrow range in which a sine condition is satisfied. In particular, in the case employing a multi-beam system (such as one chip with a plurality of light sources in particular) intended for simultaneously recording a plurality of different items of information by one scan or the like, it is necessary for the image surface curvature to be held within the range of 10 to 20 microns while the half angle of view ω is about 2 degrees, thus making it difficult to employ the collimator lenses disclosed in the above-mentioned publications.

On the other hand, as a collimator lens having a larger number of lenses, the one constituted by four to six lens elements disclosed in Japanese Unexamined Patent Publication No. 61-173215 has been known.

The lens disclosed in this publication, however, is a so-called retro-focus type lens in which a negative lens is disposed closest to the parallel luminous flux, and does not have a configuration for actively reducing the image surface curvature. In practice, the lenses shown in its examples do not yield values of image surface curvature amount which are sufficient for overcoming the problem mentioned above.

SUMMARY OF THE INVENTION

In view of the foregoing circumstances, it is an object of the present invention to provide a collimator lens which, when carrying out multi-beam scanning using a one-chip semiconductor laser equipped with two light sources or the like, can greatly reduce various kinds of aberration such as image surface curvature amount with respect to the respective light beams from the two light sources; and an optical scanning apparatus using the same.

The collimator lens in accordance with the present invention comprises, successively from a parallel luminous flux side, a first lens having a positive refracting power, second and third lenses one of which has a negative refracting power while the other having a positive refracting power, a fourth lens having a positive refracting power, and a fifth lens having a negative refracting power, the second and third lenses being cemented together; and satisfies the following conditional expression (1):

$$0.9 < |F_5/F_T| < 2.5 \qquad (1)$$

where $F_5$ is the focal length of the fifth lens; and $F_T$ is the focal length of the whole lens system.

Preferably, the first lens is a convex lens having a convex surface directed onto the parallel luminous flux side, and the fifth lens is a concave lens having a concave surface directed onto the parallel luminous flux side.

Preferably, the surface of the fifth lens on a light source side is constituted by a plane, from the viewpoint of reducing the return light to the light source and cutting down the processing cost of the lens.

Preferably, the second and third lenses constitute a cemented lens.

The optical scanning apparatus in accordance with the present invention uses the above-mentioned collimator lens.

DESCRIPTION OF THE PREFERRED EMBODIMENTS

In the following, while referring to the accompanying drawings, collimator lenses and an optical scanning apparatus in accordance with embodiments of the present invention will be explained with reference to Examples 1 to 3.

Figure 1:
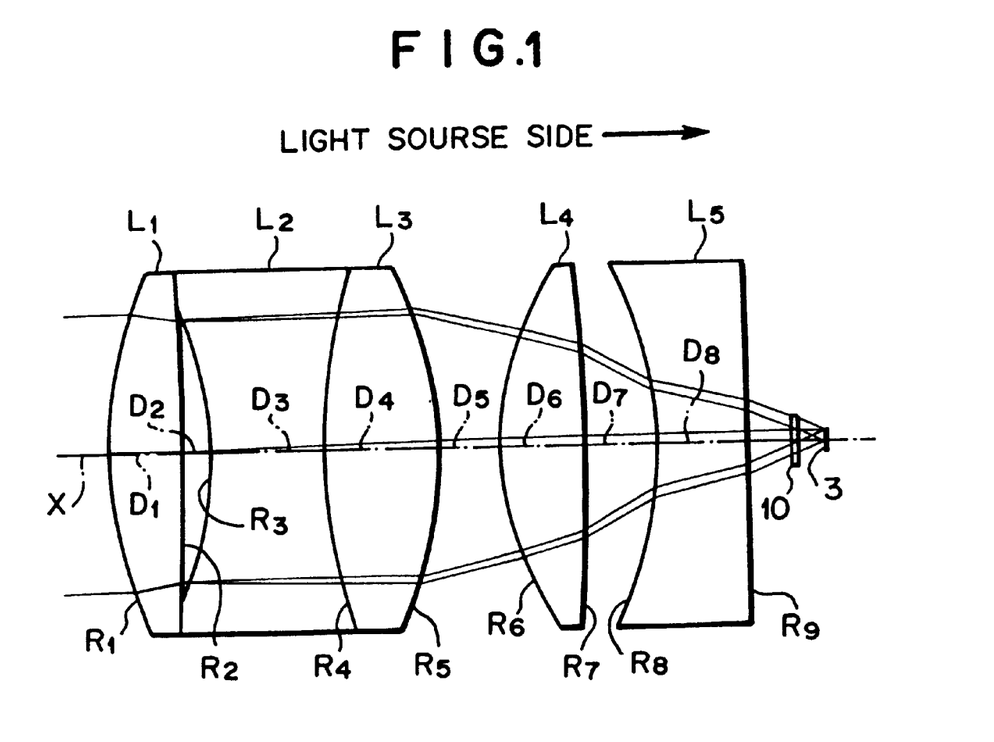
FIG. 1 is a schematic view showing a basic lens configuration of the collimator lens in accordance with any of Examples 1 to 3 of the present invention.
Figure 8:
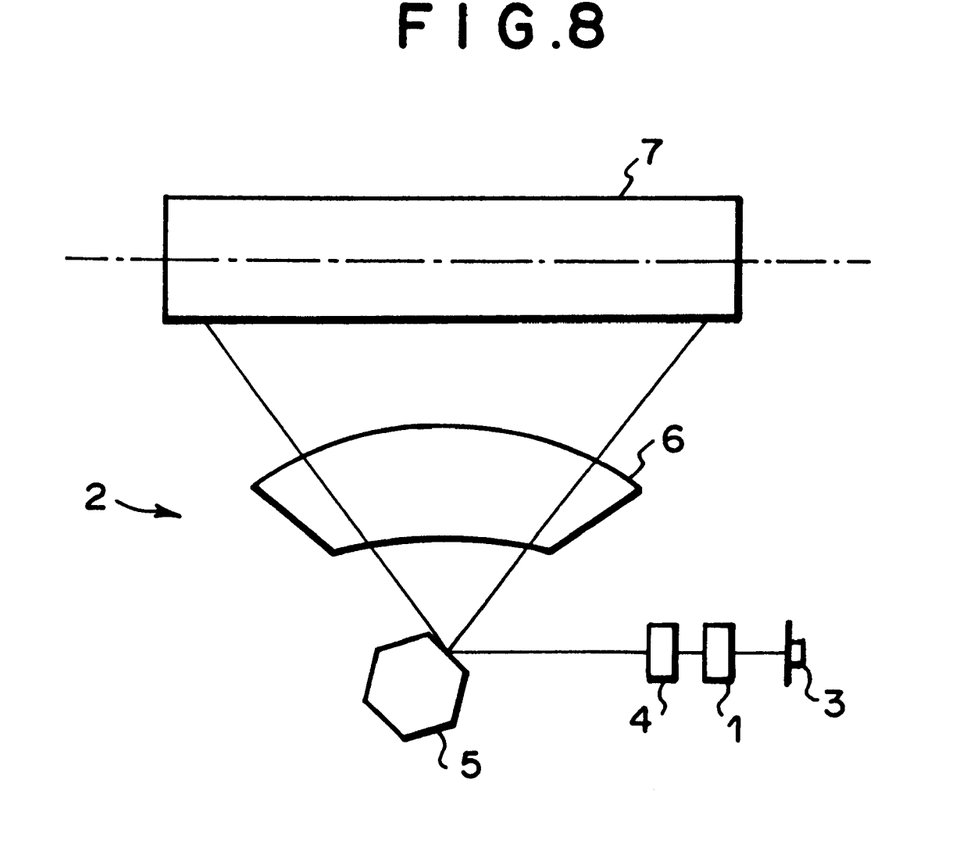
FIG. 8 is a schematic configurational view of an optical scanning apparatus using the collimator lens in accordance with any of Examples 1 to 3 of the present invention.

FIG. 1 is a view showing a basic lens configuration of the collimator lens in accordance with an embodiment of the present invention (typically representing that corresponding to Example 1), whereas FIG. 8 is a schematic configurational view of an optical scanning apparatus using the collimator lens shown in FIG. 1.

The collimator lens 1 in accordance with the present invention is used in an optical system of an optical scanning apparatus 2 for scanning a laser beam in order to record or display an image, such as laser printer, color scanner, color copier, or the like.

As shown in FIG. 8, in the optical scanning apparatus 2, a laser beam emitted from a one-chip semiconductor laser 3 equipped with two light sources (with a wavelength of 790 nm) is converted by the collimator lens 1 into a parallel luminous flux, the tilting of a polygon mirror 5 is corrected by an auxiliary optical system 4 comprising a slit, a cylindrical lens, and the like, and the resulting laser beam is deflected by the polygon mirror 5 and then is guided by an fθ lens 6 onto the surface of a photoconductive photosensitive drum 7 such that thus formed minute beam spot is scanned on the drum 7 acting as a recording medium.

As shown in FIG. 1, the collimator lens 1 in accordance with this embodiment comprises, successively from the parallel luminous flux side, a first lens $L_1$ made of a biconvex lens having a surface with a stronger curvature directed onto the parallel luminous flux side (which is a positive meniscus lens having a convex surface directed onto the parallel luminous flux side in Example 2), a second lens $L_2$ made of a biconcave lens having a surface with a stronger curvature directed onto the parallel luminous flux side (which is a biconcave lens having a surface with a stronger curvature directed onto the light source side in Example 2), a third lens $L_3$ made of a biconvex lens having a surface with a stronger curvature directed onto the light source side (which is a biconvex lens having a surface with a stronger curvature directed onto the parallel luminous flux side in Example 2), a fourth lens $L_4$ made of a biconvex lens having a surface with a stronger curvature directed onto the parallel luminous flux side, and a fifth lens $L_5$ made of a negative meniscus lens having a concave surface directed onto the parallel luminous flux side and a plane directed onto the light source side. The second lens $L_2$ and the third lens $L_3$ constitute a cemented lens. In FIG. 1, 10 refers to a cover glass of the semiconductor laser 3, whereas X indicates the optical axis.

Also, these lenses satisfy the following conditional expression (1):

$$0.9 < |F_5/F_T| < 2.5 \tag{1}$$

where $F_5$ is the focal length of the fifth lens $L_5$; and $F_T$ is the focal length of the whole lens system.

The above-mentioned conditional expression (1) is intended for making out-of-axis coma favorable in particular. Namely, below the lower limit thereof, the out-of-axis coma would deteriorate, so that performances which are tolerant of use cannot be satisfied even if image surface curvature is corrected; whereas, above the upper limit thereof, the image surface would be short of correction, thus making it difficult for the collimator lens to be employed in a semiconductor laser having a large angle of view.

In thus configured collimator lens 1, various kinds of aberration including image surface curvature can be made favorable with respect to both of the two light sources. Also, since the surface of the fifth lens $L_5$ on the light source side is constituted by a plane, the return light to the light source 3 can be reduced, and the processing cost for the lens can be cut down.

In the following, Examples 1 to 3 will be explained with reference to specific values.

EXAMPLE 1

Table 1 (follows) shows the radius of curvature R (mm) of each lens surface, center thickness of each lens and air space between neighboring lenses D (mm), and refractive index N and Abbe number of each lens at d-line (587.56 nm) in Example 1.

In Table 1, as well as Tables 2 and 3 which will be mentioned later, the numbers referring to the letters R, D, N, and ν successively increase from the parallel luminous flux side.

Also, the lower part of Table 1 shows values of focal length $F_T$ of the whole lens system and $|F_5/F_T|$ in the collimator lens 1 in Example 1.

As can be seen from Table 1, conditional expression (1) is satisfied in Example 1.

EXAMPLE 2

Table 2 (follows) shows the radius of curvature R (mm) of each lens surface, center thickness of each lens and air space between neighboring lenses D (mm), and refractive index N and Abbe number of each lens at d-line in Example 2.

Also, the lower part of Table 2 shows values of focal length $F_T$ of the whole lens system and $|F_5/F_T|$ in the collimator lens 1 in Example 2.

As can be seen from Table 2, conditional expression (1) is satisfied in Example 2.

EXAMPLE 3

Table 3 (follows) shows the radius of curvature R (mm) of each lens surface, center thickness of each lens and air space between neighboring lenses D (mm), and refractive index N and Abbe number of each lens at d-line in Example 3.

Also, the lower part of Table 3 shows values of focal length $F_T$ of the whole lens system and $|F_5/F_T|$ in the collimator lens 1 in Example 3.

As can be seen from Table 3, conditional expression (1) is satisfied in Example 3.

Figure 2A:
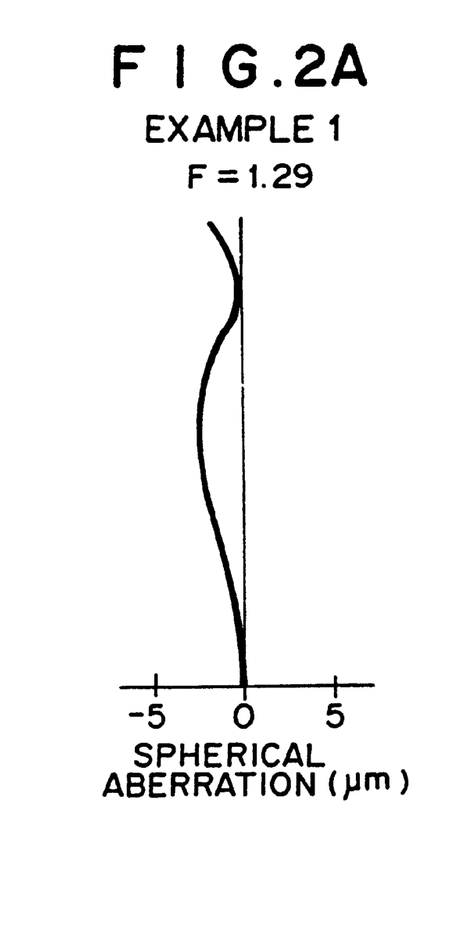
FIGS. 2A, 2B and 2C are aberration charts (showing spherical aberration, astigmatism, and distortion) of the collimator lens in accordance with Example 1.
Figure 2B:
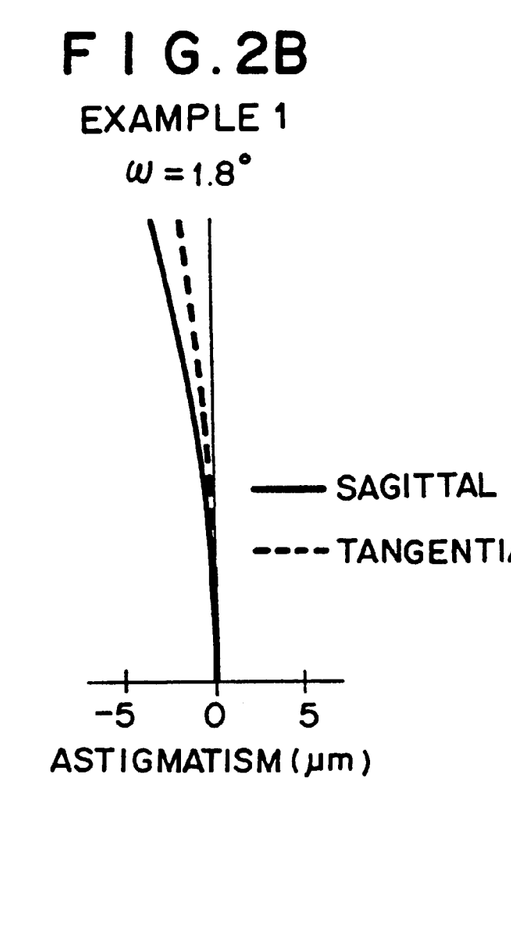
Figure 2C:
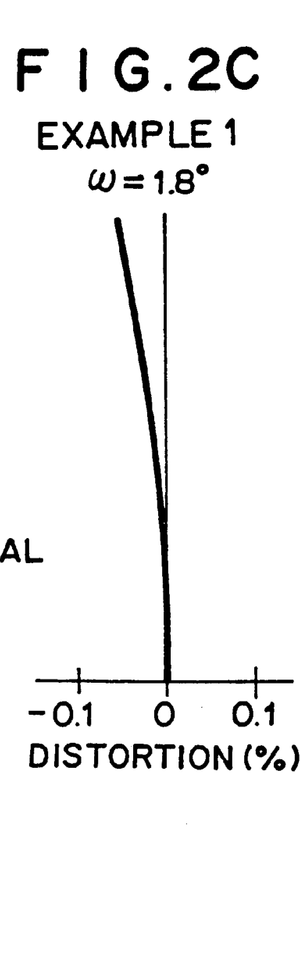
Figure 3A:
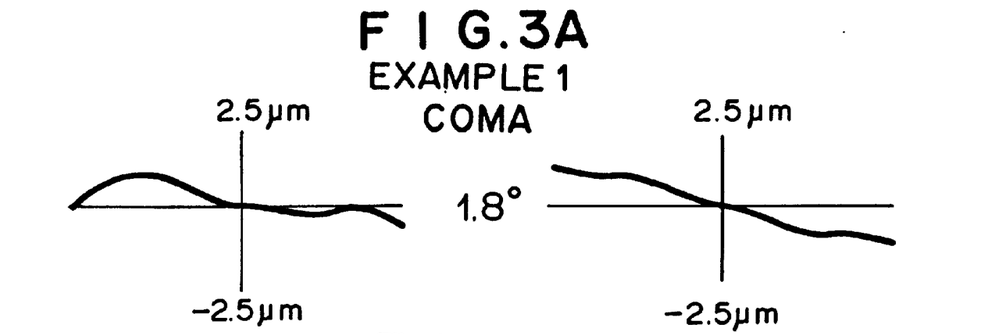
FIGS. 3A, 3B, 3C and 3D are aberration charts showing coma of the collimator lens in accordance with Example 1.
Figure 3B:
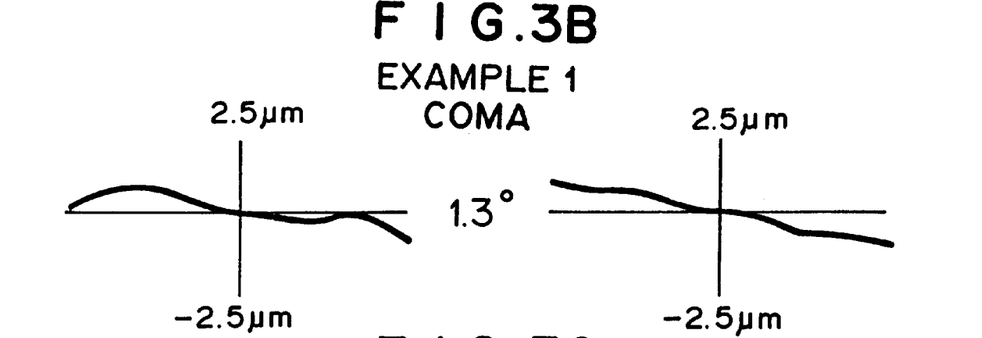
Figure 3C:
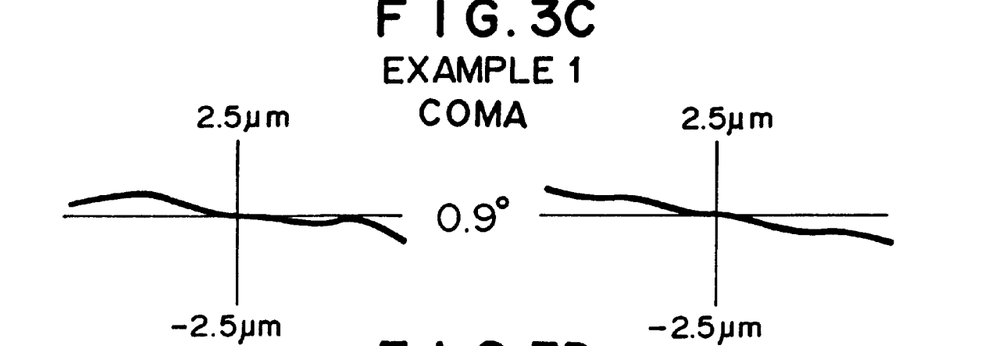
Figure 3D:
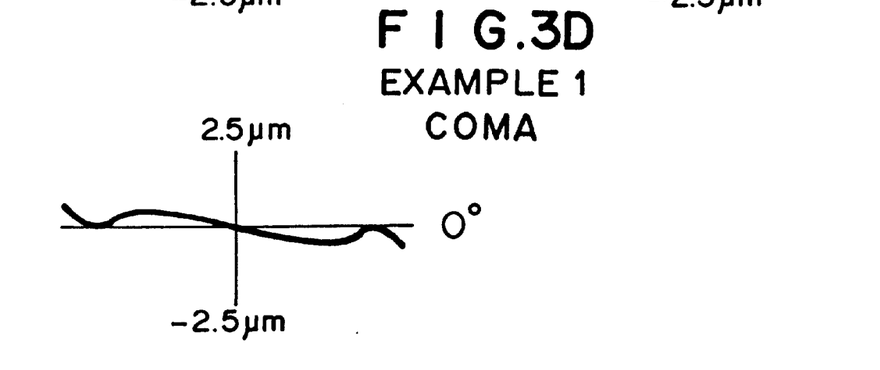
Figure 4A:
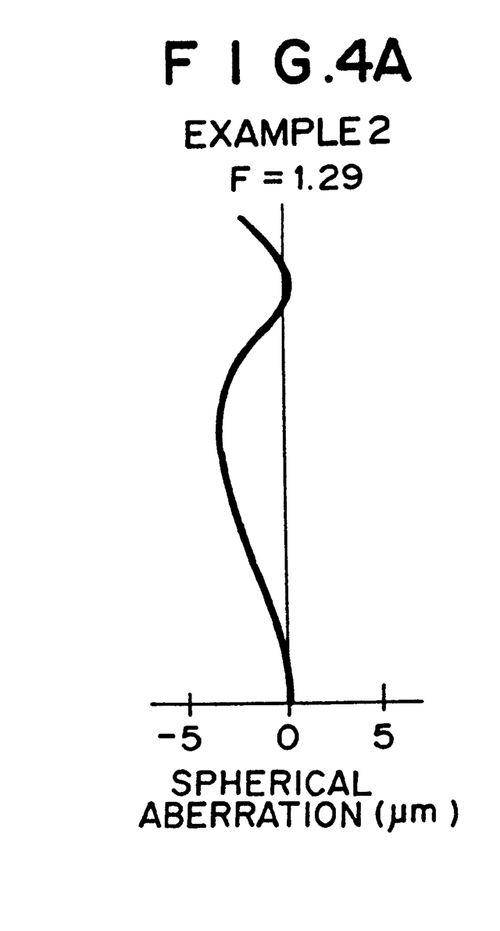
FIGS. 4A, 4B and 4C are aberration charts is an aberration chart (showing spherical aberration, astigmatism, and distortion) of the collimator lens in accordance with Example 2.
Figure 4B:
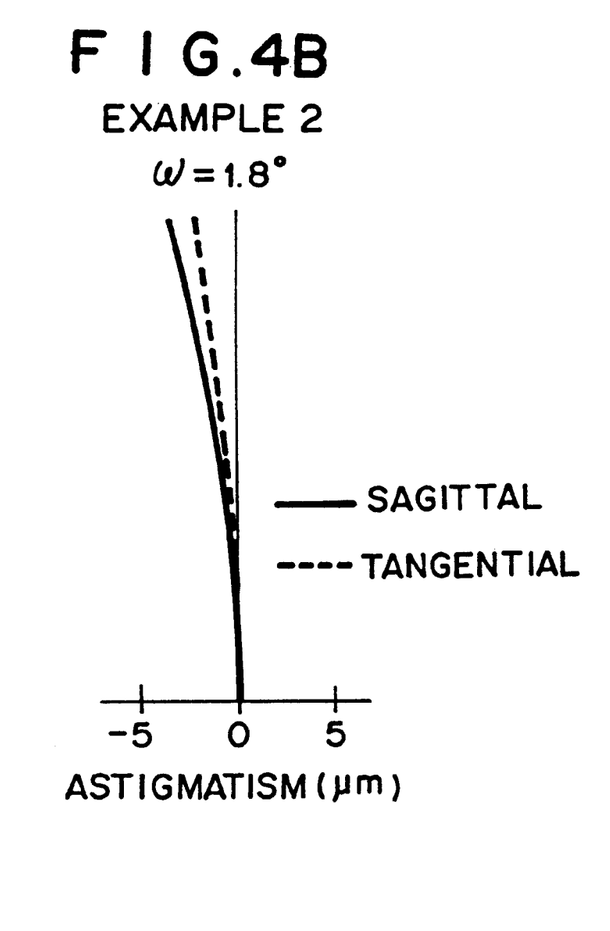
Figure 4C:
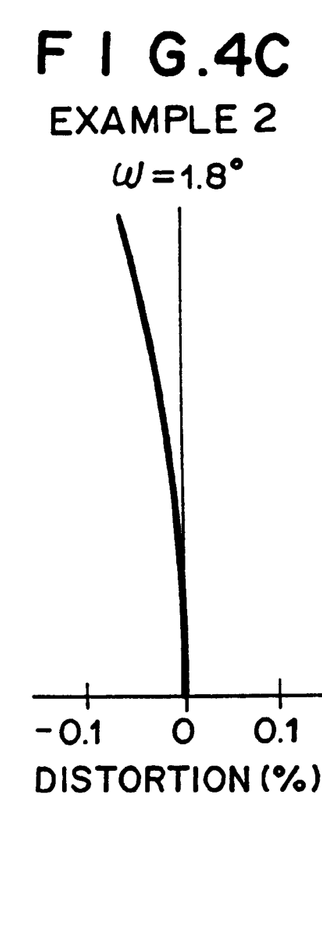
Figure 5A:
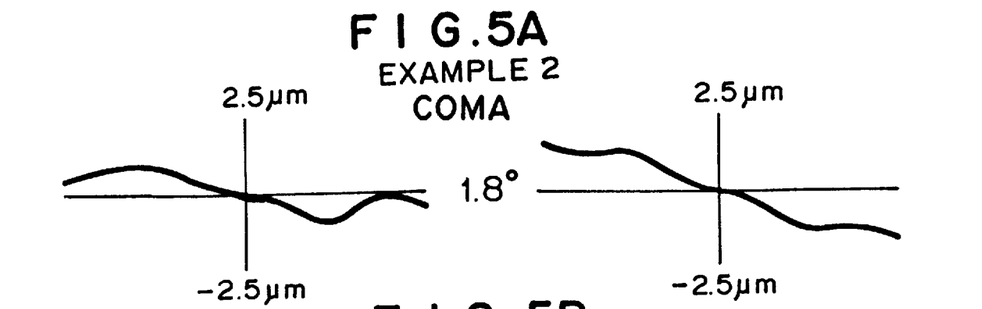
FIGS. 5A, 5B, 5C and 5D are aberration charts is an aberration chart showing coma of the collimator lens in accordance with Example 2.
Figure 5B:
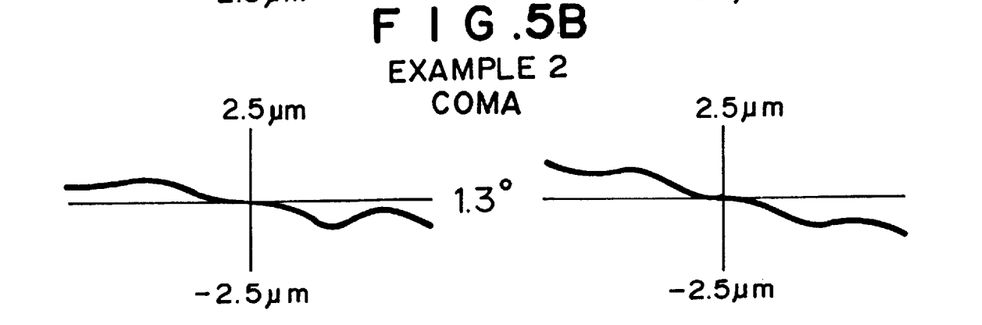
Figure 5C:
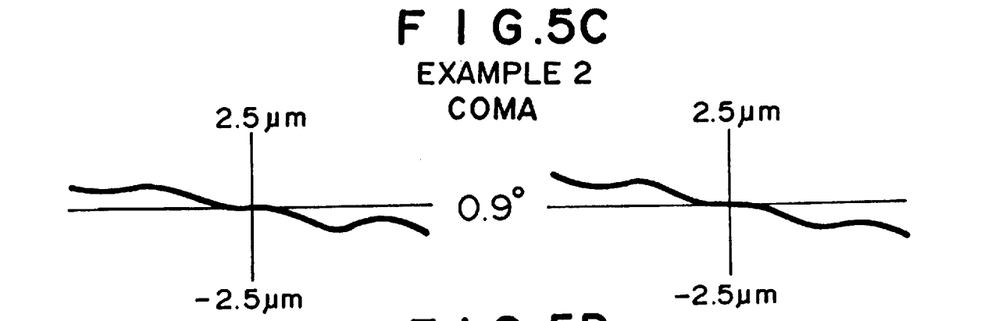
Figure 5D:
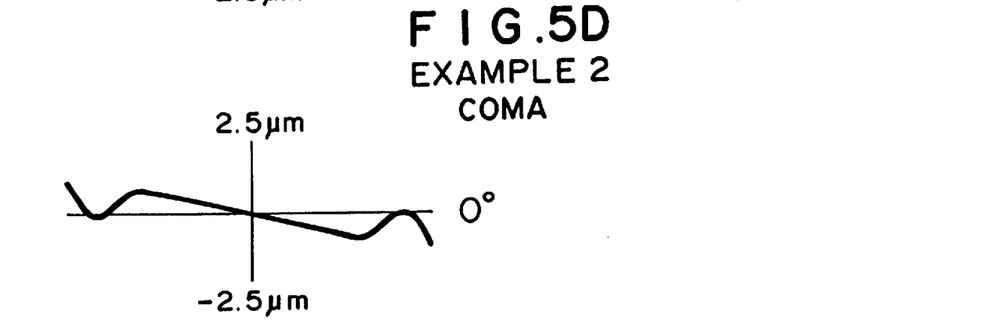
Figure 6A:
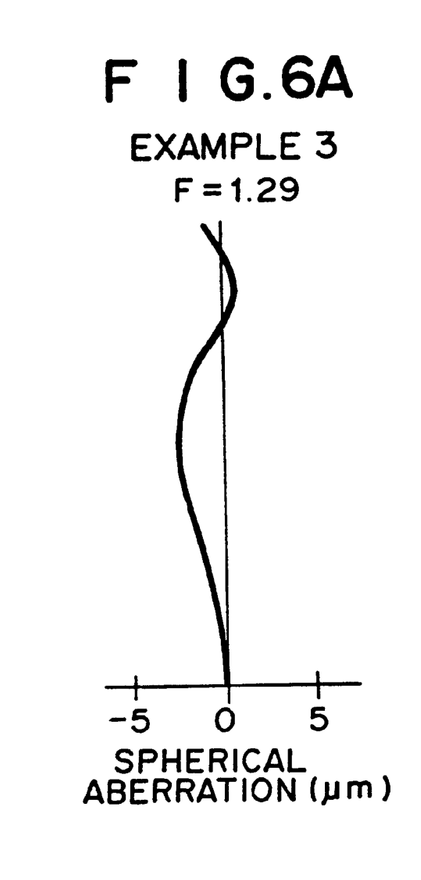
FIGS. 6A, 6B and 6C are aberration charts is an aberration chart (showing spherical aberration, astigmatism, and distortion) of the collimator lens in accordance with Example 3.
Figures 6B, 6C:
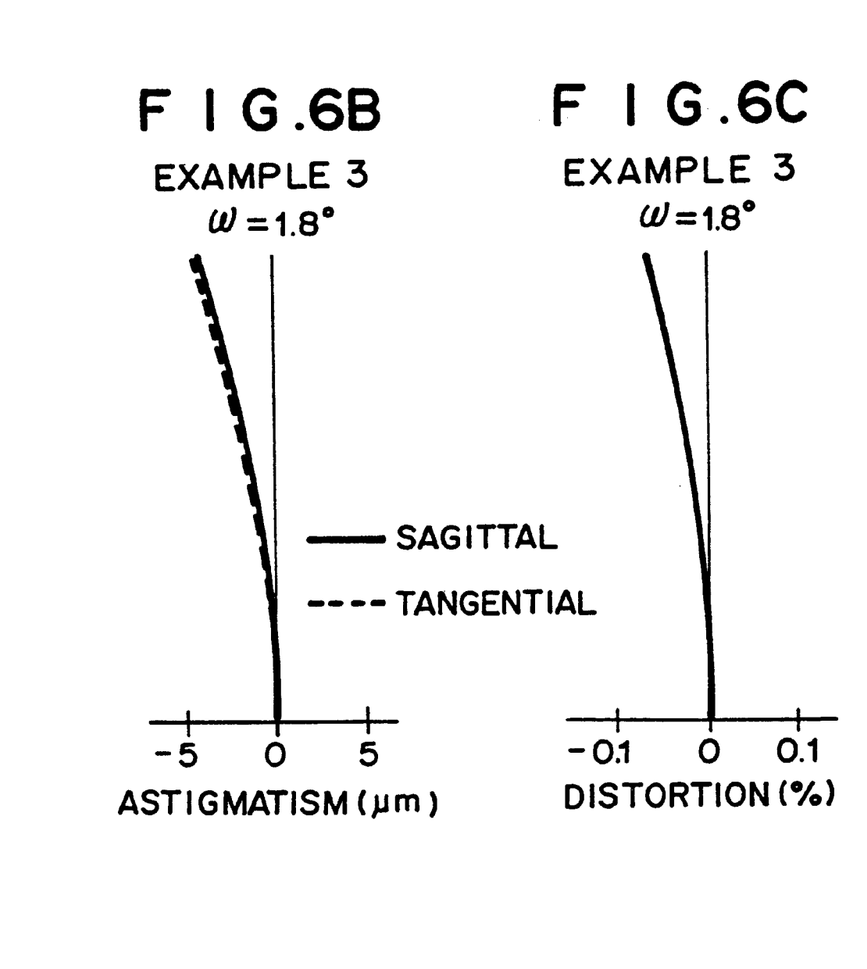
Figure 7A:
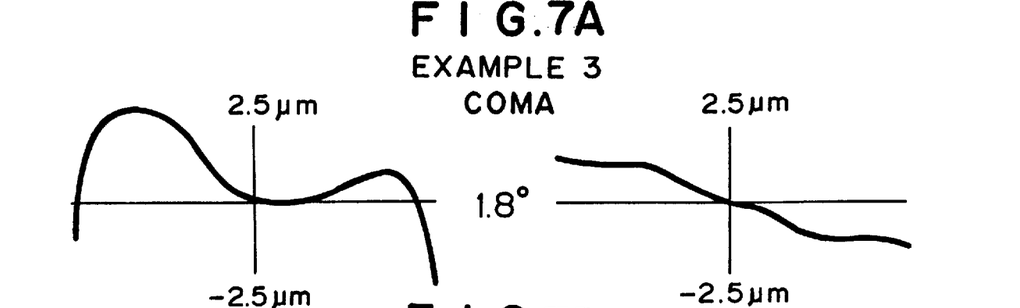
FIGS. 7A, 7B, 7C and 7D are aberration charts is an aberration chart showing coma of the collimator lens in accordance with Example 3.
Figure 7B:
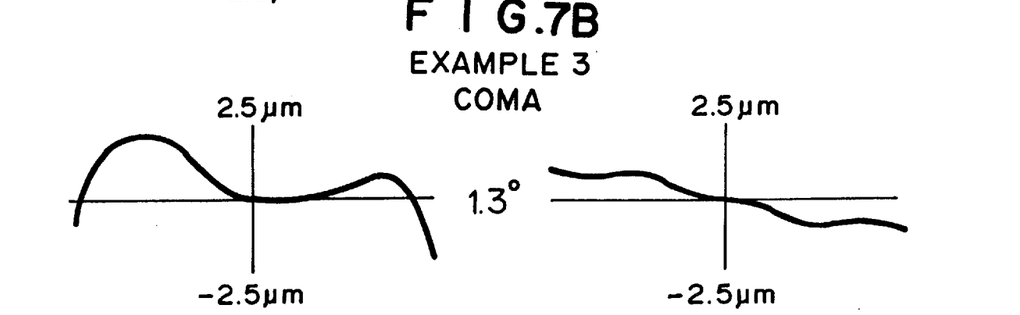
Figure 7C:
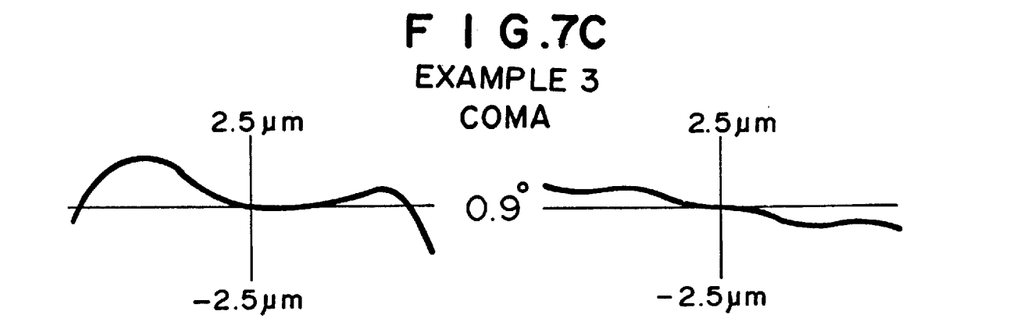
Figure 7D:
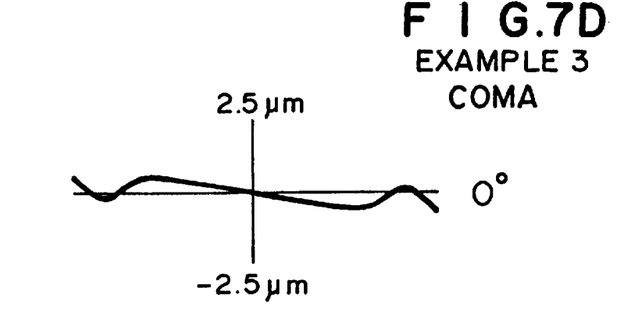

FIGS. 2, 4, and 6 are aberration charts (each showing spherical aberration, astigmatism, and distortion) in Examples 1 to 3, respectively; whereas FIGS. 3, 5, and 7 are aberration charts showing coma in Examples 1 to 3, respectively. In these aberration charts, ω indicates the half angle of view. Each aberration chart for astigmatism shows aberration characteristics with respect to sagittal (S) and tangential (T) image surfaces.

As can be seen from FIGS. 2 to 7, all of the various kinds of aberration can be made favorable in each of the above-mentioned Examples.

Without being restricted to the above-mentioned Examples, the collimator lens of the present invention can be modified in various manners. For example, values of radius of curvature R and lens space (or lens thickness) D can appropriately be changed.

The collimator lens of the present invention can also be used as an objective lens intended for forming on a recording medium an object disposed on the parallel luminous flux side, while this imaging position is scanned with a laser beam.

The collimator lens in accordance with the present invention comprises, successively from the parallel luminous flux side, a first lens having a positive refracting power, second and third lenses one of which has a negative refracting power while the other having a positive refracting power, a fourth lens having a positive refracting power, and a fifth lens having a negative refracting power, the second and third lenses being cemented together; and satisfies a predetermined conditional expression. Hence, in the collimator lens in accordance with the present invention and the optical scanning apparatus using the same, in the case where multi-beam scanning is carried out using a one-chip semiconductor laser equipped with two light sources or the like, various kinds of aberration, such as image surface curvature amount in particular, can greatly be reduced with respect to the respective light beams from the light sources, whereby the quality of the image formed by scanning in the case using a multi-beam system can be improved.

Further, when the surface of the fifth lens on the light source side is constituted by a plane, then the return light to the light source can be reduced, and the processing cost of the lens can be cut down.

TABLE 1

| Surface | R | D | $N_d$ | $v_d$ |
|---|---|---|---|---|
| 1 | 18.45 | 3.32 | 1.71700 | 47.9 |
| 2 | −109.30 | 1.18 | | |
| 3 | −15.99 | 5.00 | 1.78472 | 25.7 |
| 4 | 25.95 | 5.00 | 1.71300 | 53.9 |
| 5 | −18.16 | 2.83 | | |
| 6 | 13.46 | 3.89 | 1.71300 | 53.9 |
| 7 | −88.94 | 3.05 | | |
| 8 | −18.07 | 3.91 | 1.78472 | 25.7 |
| 9 | 0.00 | | | |

$F_T = 15.70$
$|F_5/F_T| = 1.50$

TABLE 2

| Surface | R | D | $N_d$ | $v_d$ |
|---|---|---|---|---|
| 1 | 14.17 | 3.37 | 1.71700 | 47.9 |
| 2 | 93.56 | 2.01 | | |
| 3 | −22.08 | 5.00 | 1.78472 | 25.7 |
| 4 | 15.10 | 5.00 | 1.71300 | 53.9 |
| 5 | −29.59 | 2.22 | | |
| 6 | 10.41 | 4.58 | 1.71300 | 53.9 |
| 7 | −39.30 | 1.87 | | |
| 8 | −12.41 | 3.20 | 1.78472 | 25.7 |
| 9 | 0.00 | | | |

$F_T = 15.70$
$|F_5/F_T| = 1.03$

TABLE 3

| Surface | R | D | $N_d$ | $v_d$ |
|---|---|---|---|---|
| 1 | 30.52 | 3.23 | 1.71700 | 47.9 |
| 2 | −39.61 | 0.97 | | |
| 3 | −13.31 | 5.00 | 1.78472 | 25.7 |
| 4 | 36.21 | 5.00 | 1.71300 | 53.9 |
| 5 | −16.14 | 3.33 | | |
| 6 | 14.17 | 3.78 | 1.71300 | 53.9 |
| 7 | −189.93 | 3.64 | | |
| 8 | −27.29 | 3.24 | 1.78472 | 25.7 |

TABLE 3-continued

| Surface | R | D | $N_d$ | $v_d$ |
|---|---|---|---|---|
| 9 | 0.00 | | | |

$F_T = 15.70$
$|F_5/F_T| = 2.27$

What is claimed is:

1. A collimator lens comprising, successively from a parallel luminous flux side, a first lens having a positive refracting power, second and third lenses one of which has a negative refracting power while the other having a positive refracting power, a fourth lens having a positive refracting power, and a fifth lens having a negative refracting power, said second and third lenses being cemented together, said collimator lens satisfying the following conditional expression (1):

$$0.9 < |F_5/F_T| < 2.5 \quad (1)$$

where
$F_5$ is the focal length of the fifth lens; and
$F_T$ is the focal length of the whole lens system.

2. A collimator lens according to claim 1, wherein said first lens is a positive lens having a convex surface directed onto the parallel luminous flux side, and said fifth lens is a negative lens having a concave surface directed onto the parallel luminous flux side.

3. A collimator lens according to claim 1, wherein the surface of said fifth lens on a light source side is constituted by a plane.

4. A collimator lens according to claim 1, wherein said second and third lenses constitute a cemented lens.

5. An optical scanning apparatus using the collimator lens according to claim 1.

6. A collimator lens consisting, successively from a parallel luminous flux side, a first lens having a positive refracting power, second and third lenses one of which has a negative refracting power while the other having a positive refracting power, a fourth lens having a positive refracting power, and a fifth lens having a negative refracting power, said second and third lenses being cemented together, said collimator lens satisfying the following conditional expression (1):

$$0.9 < |F_5/F_T| < 2.5 \quad (1)$$

where
$F_5$ is the focal length of the fifth lens; and
$F_T$ is the focal length of the whole lens system.

7. A collimator lens according to claim 6, wherein said first lens is a positive lens having a convex surface directed onto the parallel luminous flux side, and said fifth lens is a negative lens having a concave surface directed onto the parallel luminous flux side.

8. A collimator lens according to claim 6, wherein the surface of said fifth lens on a light source side is constituted by a plane.

9. A collimator lens according to claim 6, wherein said second and third lenses constitute a cemented lens.

10. An optical scanning apparatus using the collimator lens according to claim 6.

* * * * *